Aug. 22, 1939.  C. R. BUSCH  2,170,112
CONSTRUCTION OF CAR TRUCKS AND WORKING PARTS THEREOF
Filed March 15, 1937    4 Sheets-Sheet 1

INVENTOR
Charles R. Busch.
BY
ATTORNEY

Aug. 22, 1939.   C. R. BUSCH   2,170,112
CONSTRUCTION OF CAR TRUCKS AND WORKING PARTS THEREOF
Filed March 15, 1937   4 Sheets-Sheet 2
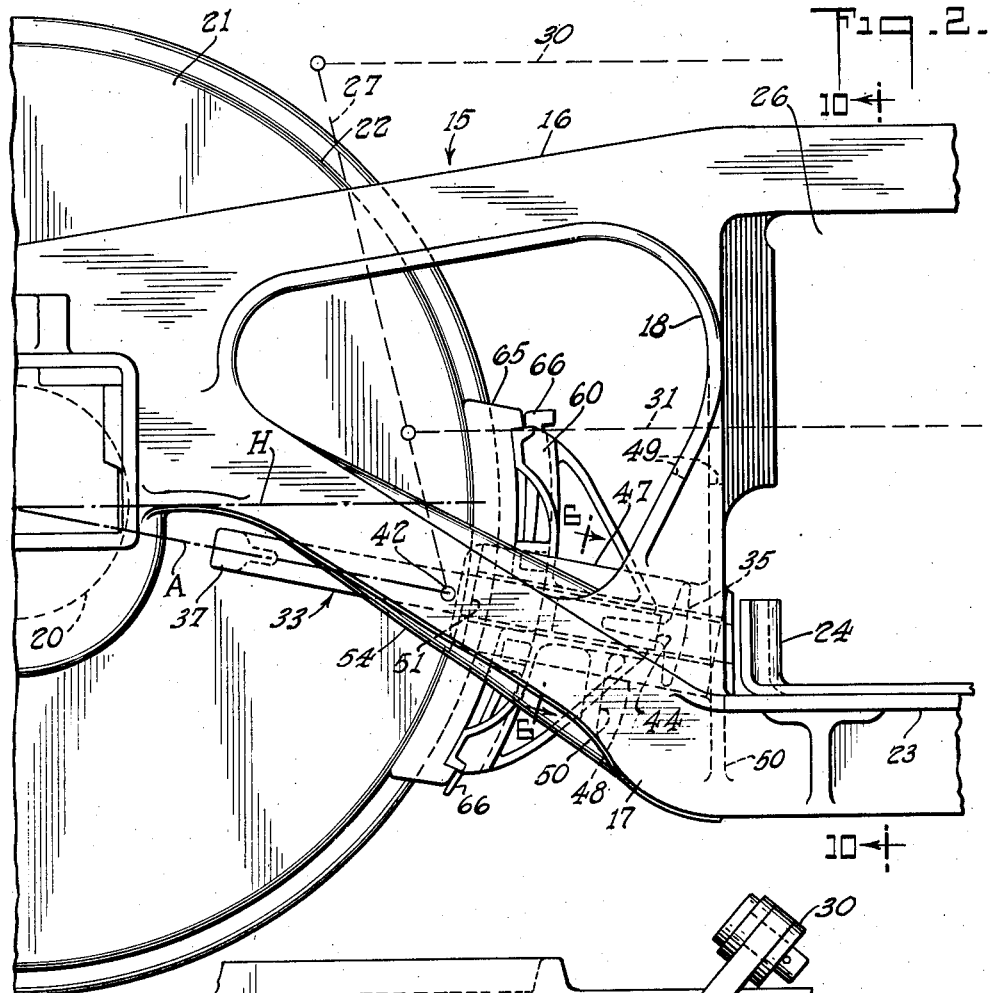
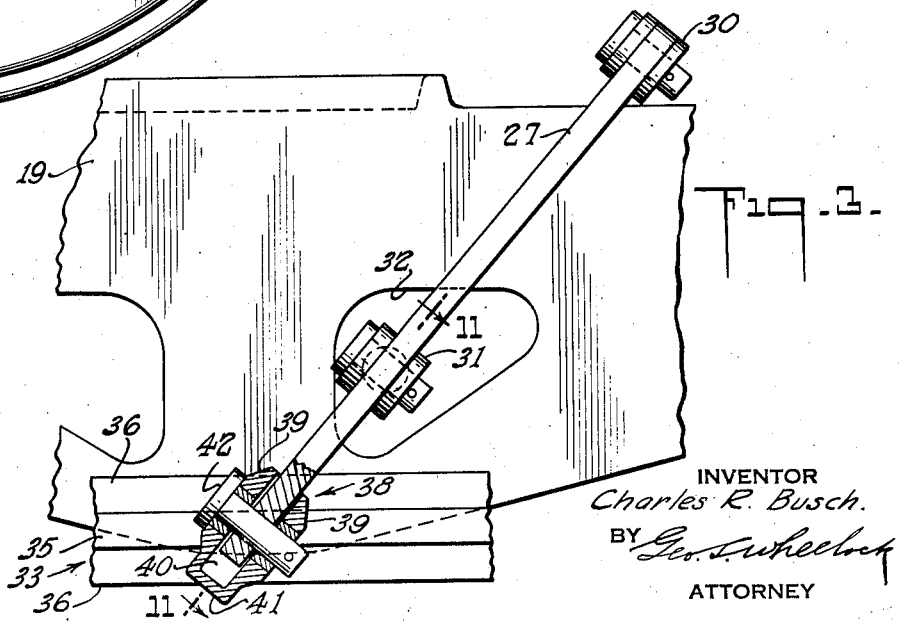
INVENTOR
Charles R. Busch.
BY
ATTORNEY Aug. 22, 1939.    C. R. BUSCH    2,170,112
CONSTRUCTION OF CAR TRUCKS AND WORKING PARTS THEREOF
Filed March 15, 1937    4 Sheets-Sheet 3
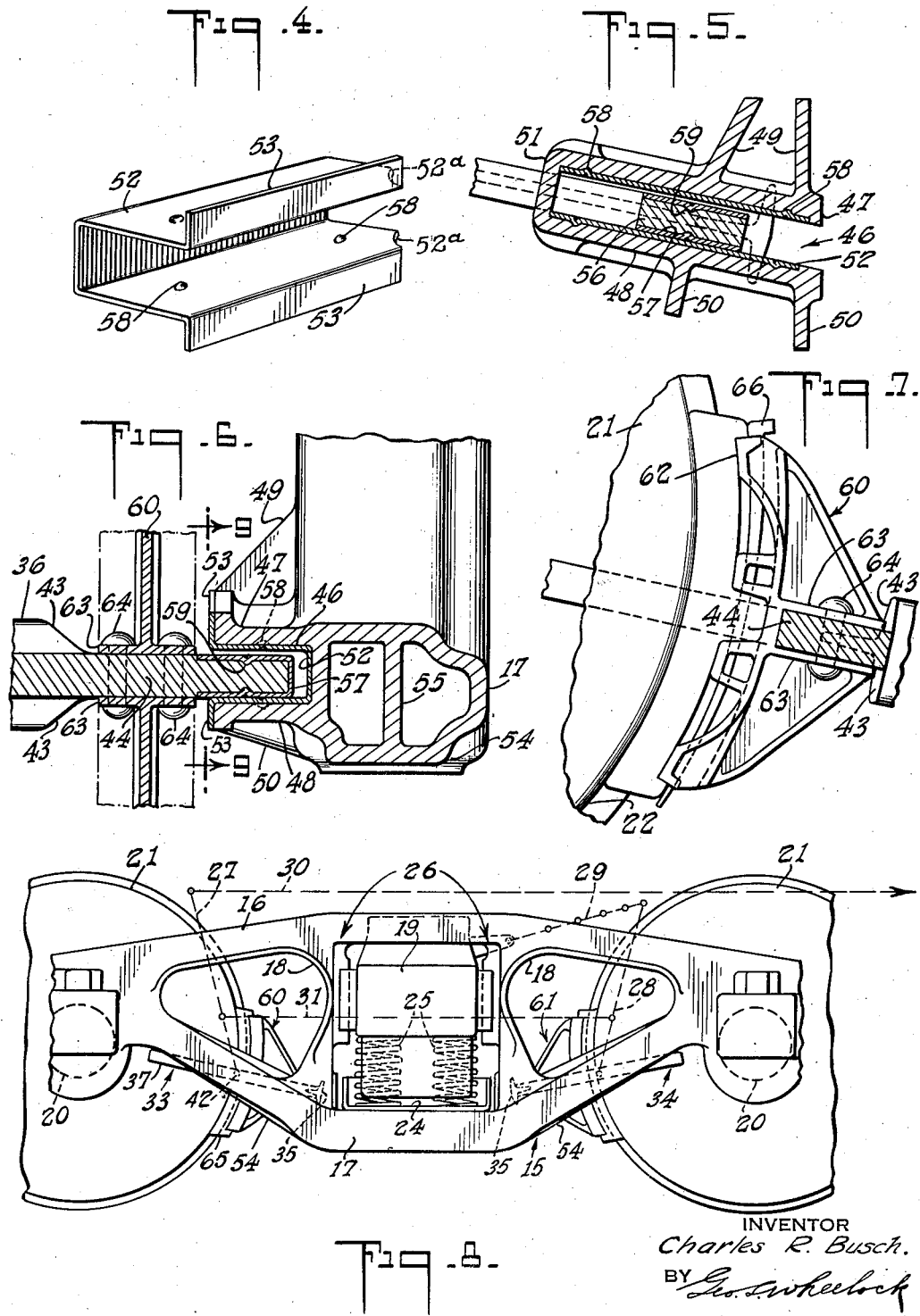

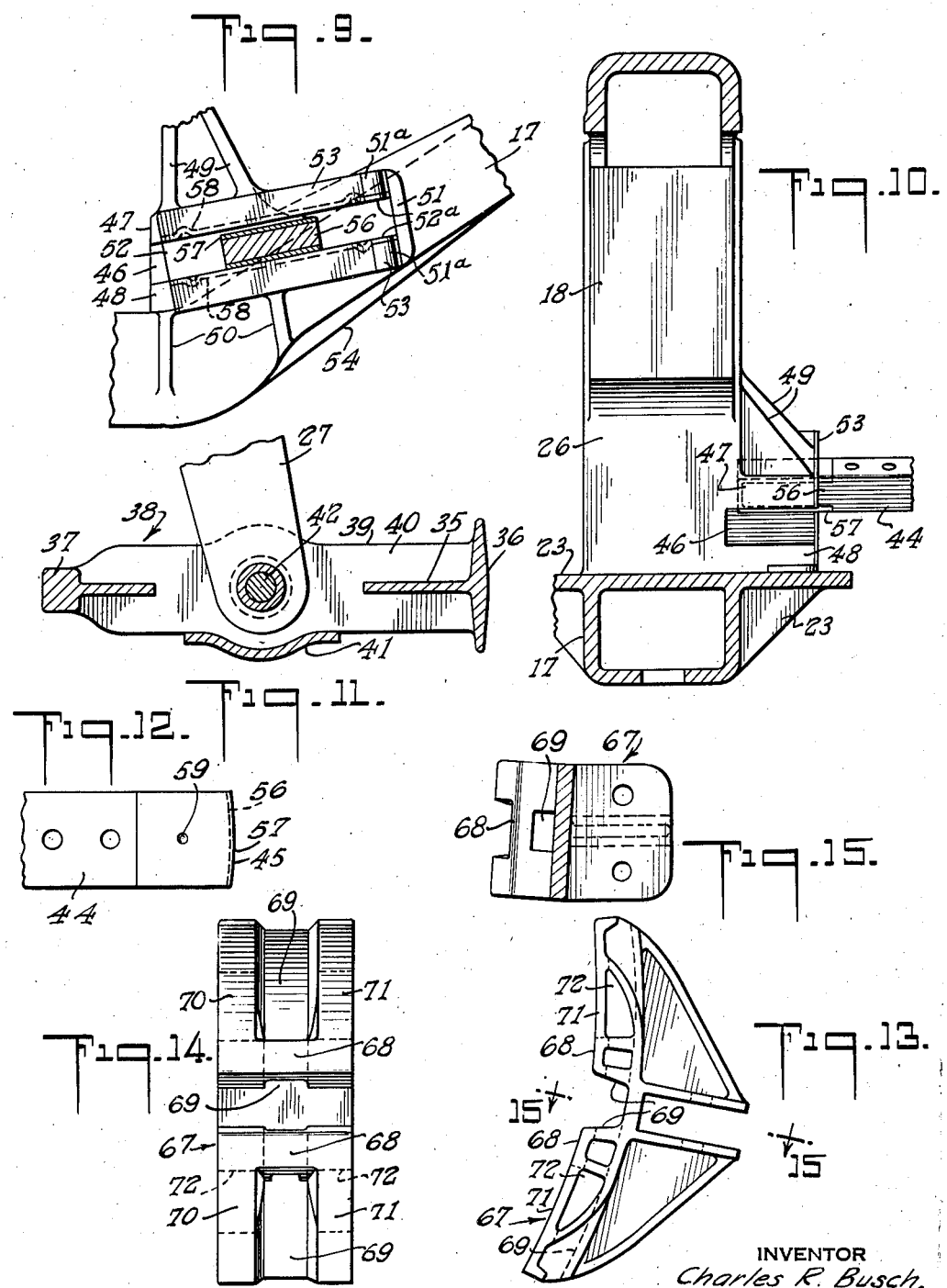

Patented Aug. 22, 1939

2,170,112

UNITED STATES PATENT OFFICE 2,170,112

CONSTRUCTION OF CAR TRUCKS AND WORKING PARTS THEREOF

Charles R. Busch, Orange, N. J., assignor to Buffalo Brake Beam Company, New York, N. Y., a corporation of New York Application March 15, 1937, Serial No. 130,881

23 Claims. (Cl. 188—212)

The present invention principally relates to the provision of a truck unit of simple and efficient design and construction, including a self aligning braking system with a minimum number of parts and having a high factor of safety. Those familiar with the art will readily see the advantages of the invention in its relation to modern trucks as railway speeds have increased as much as two or threefold. The conventional brake rigging is suspended by the use of hangars, pins, locks and other elements, due to which excessive wear and looseness soon develops as well as chattering during brake application, inasmuch as such parts have small bearing surfaces and the dynamic forces set up in the truck frequently cause such parts to be broken or detached and therefore great loss to the equipment follows. The present braking system now generally in use is so known to failure that supports and accessories of various types must be employed to safeguard the brake rigging, such supports adding to the weight and the number of the parts and also add to the first cost and the maintenance cost. Furthermore, such a brake system is overbalanced and expensive adjustment features are used. In the trucks now in use, each has two integral cast or forged side frames with journal boxes integral therewith, two pairs of wheels mounted on axles, with journals interlocked by means of bearings and wedges with the side frames. The bolster has interlocking elements engaging the side frames, and the truck may or may not have a spring plank, there being springs located under the bolster. When assembled as stated, those skilled in the art will see that this assemblage forms an interlocked unit of known safety and design. The conventional brake rigging, excluding brake levers, brake rods and connecting rods, has a total of approximately sixty parts, all of which are held in place by pins, rivets, cotters, nuts and the like, and are subjected to great wear. Furthermore, the brake beam is in the first instance held by brake hangers which are attached to the brake heads and not to the brake beam body. Each hanger moves in an arc, and as wheel and brake shoe wear takes place, plus the wear on the brake rigging, the force is not applied on a radial line from the center of the wheel, so that this, together with the fact that the brake head is made to work at a specific angle, causes great loss in brake efficiency, unevenly worn and broken shoes and also sets up torsional strains in the beams, hangers and other parts, with resultant failures.

Attempts have been made to improve car trucks by way of guiding the brake beams upon the side frames in applying or releasing braking pressure and in some cases the beams are caused to move on an inclination, but these attempts do not overcome the failures mentioned. It is one of the objects of the present invention to overcome these failures and the excessive cost of maintenance, to which end guides are preferably cast or forged on the truck side frames to extend at an angle of approximately 12 degrees from the horizontal extending from the center of a wheel or its anxle. Preferably these guides become a part of the truck side columns and the tension member of the frame, extending from the columns and along the frame, which are preferably backed up by suitable reinforcing ribs. Emergency means are preferably provided for removing the brake beam, as by removing the spring plank if there should be one and raising the bolster. Preferably the brake beam is of the truss type which can be cast, forged or built up, the beam to have its greatest dimension or width at its center and to be cambered, with a strut member tying the compression member and tension member together. Preferably the brake beam has a regular oblong section at each of its outer ends to interlock with the guides on the truck side frames and still be capable of movement so as to apply or release braking pressure.

When a brake beam with a strut is employed it is preferred that the latter be of safety construction with its brake lever receiving slot or opening to be so closed at the bottom as to guard against the brake lever slipping through in case of a broken or lost pivot connection. Preferably each brake head is made concentric with the wheel and its upper and lower halves formed identical with each other. Furthermore, in view of the fact that the camber of the brake beam cannot be held or set to the degree desired, it is preferred to form the face of the brake head at an angle of inclination transversely thereof to correspond with the coning or beveling of the car wheel, so as to bring the brake shoe which is held on the beam into full contact with the tread of the wheel. Furthermore, as it is preferred to make the brake head with identical upper and lower halves, with an inclined face it will be seen that it can be used at either end of the beam as a right or left by simply inverting the same if it is to be applied to the one end or the other. Furthermore, it is preferred to so secure the heads on the ends of the beam that they may be readily removed for replacement without the necessity of removing the beam from the truck.

It will be apparent to those skilled in the art that the present invention eliminates fifty parts of each car truck such as at present in use, most of which parts are secured by pins, bolts, nuts and rivets, all of which become worn or broken or lost, so that a property loss running into the millions is caused.

The preceding statements setting forth the principal objects of the present invention, the invention consists of certain features of construction and combinations of parts to be hereinafter described and then claimed with reference to the accompanying drawings illustrating, and the specification herein describing, the invention in compliance with the patent statutes in such cases made and provided and the claims as required pointing out the part, improvement or combination in which the invention resides, and in which drawings:

Fig. 2 is a side elevation of the car truck parts shown in Fig. 1, wherein the brake beam operating mechanism is indicated in broken lines;

Fig. 3 is a broken sectional elevation showing the live brake lever and the bolster, together with a part of the brake beam, the strut thereof being in transverse section at the pivot of the live lever;

Fig. 4 is a perspective view of a lining or wear plate for the guide of the brake beam;

Fig. 5 is a detail section of one of the guides and the end of the brake beam therein, on line 5—5 of Fig. 1, looking in the direction of the arrows;

Fig. 6 is a broken sectional view of a side frame and one end of the brake beam taken on the line 6—6, Fig. 2, looking in the direction of the arrows;

Fig. 7 is a broken sectional side elevation showing a brake head, shoe and car wheel, the shoe engaging the tread of the wheel, and taken on the line 7—7, Fig. 1, looking in the direction of the arrows;

Fig. 8 is a side elevation of the improved car truck parts broken away and parts in broken lines;

Fig. 9 is a sectional side elevation, parts broken away, taken on line 9—9, Fig. 6, looking in the direction of the arrows;

Fig. 10 is a sectional elevation on the line 10—10, Fig. 2, parts being broken away;

Fig. 11 is a sectional elevation on the line 11—11, Fig. 3, looking in the direction of the arrows;

Fig. 12 is a plan, broken away, of one end of the brake beam;

Fig. 13 is a side elevation of a modified construction of brake head;

Fig. 14 is a face elevation thereof; and

Fig. 15 is a transverse section of Fig. 13 on line 15—15.

Figure 1:
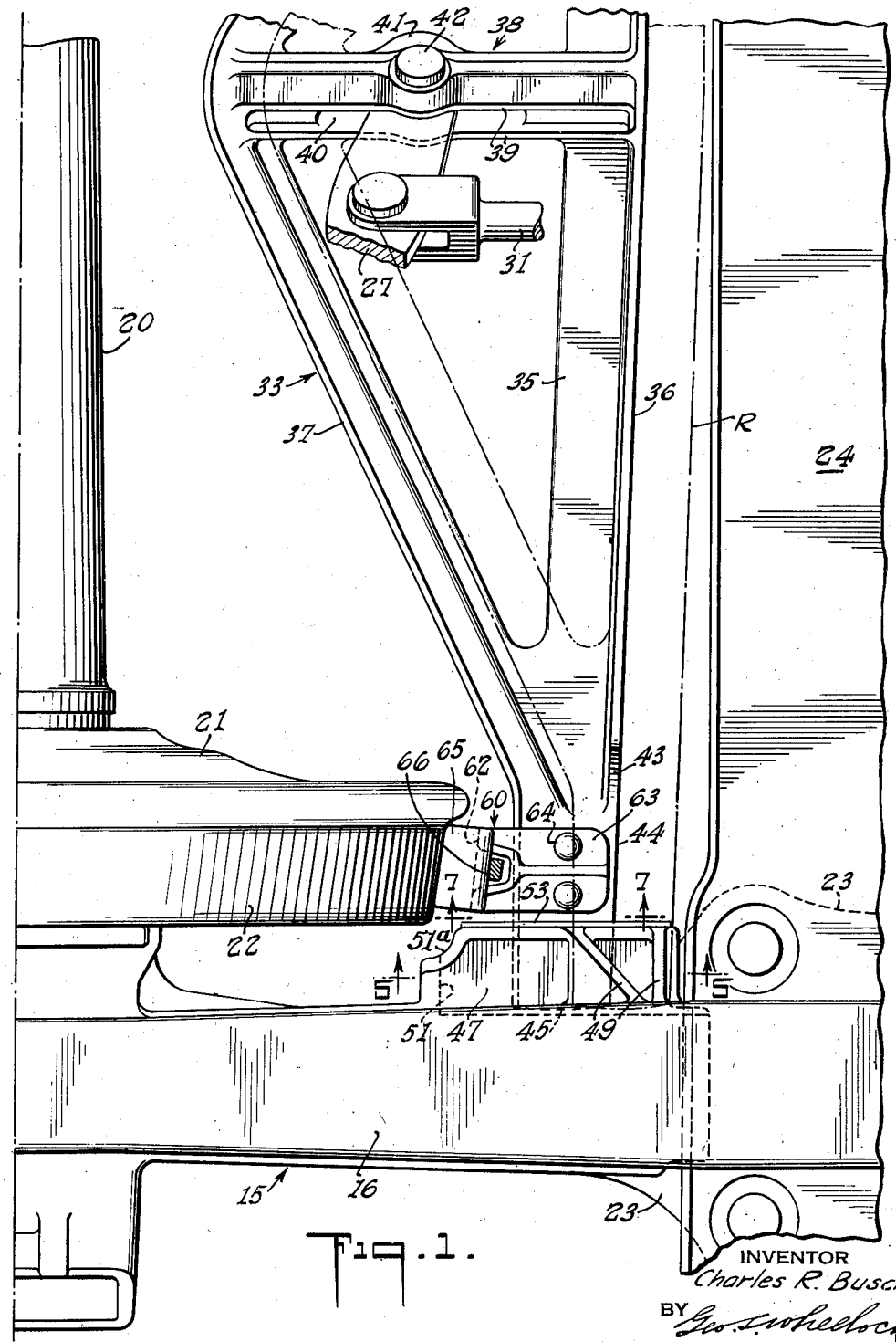
Fig. 1 is a plan view of the improved car truck showing parts broken away and illustrating only so much of the same as is necessary, namely, one-half, the other half not shown being clearly understood.

Referring to Figs. 1, 2 and 8 of the drawings, one of the side frames of the truck is illustrated, it being understood that the other side frame would be similar thereto, although not illustrated, whereas the other half section of the truck and its parts and members are to be of the same construction as the half parts which are illustrated. The side frames such as 15 may be of suitable design and construction, although it is preferred that each of them be constructed in truss form having a compression member 16 and a tension member 17, the tension member preferably to be constructed and modified according to this description and the drawings.

A pair of columns 18 is located at each side of the bolster 19 for guiding it in its up and down movements, the bolster serving, if desired, to hold the side frames in assembled relation with the assistance of the wheel axles 20 on which the wheels 21 are mounted. Each wheel usually has beveled treads 22 or what is known as coning as customarily practiced. Such coning is usually formed at an angle of 1 degree in 20, although the same may be different where required. It is to be understood that where a side frame is referred to, the opposite side frame will be of corresponding construction. Side frame 15 is provided on its tension member 17 with spring supporting brackets 23 which may also support a spring plank 24 if such plank be used. The bolster is supported by supporting springs 25 which may be arranged in a spring nest which is located within the window opening 26 in the side frame, in which the bolster is guided at each end by the columns 18. The spring nest may rest on the spring plank or directly on the side frame.

Referring again to Figs. 1, 2 and 8 and also to Fig. 3, the usual type of brake beam operating mechanism is employed, the same including a live lever 27, a dead lever 28 provided with adjusting linkage 29, a brake lever operating rod 30 and a connecting rod 31 for the levers. In the illustrated form of the invention the connecting rod 31 preferably passes through a transverse opening 32 through the bolster 19, that is, when the invention is applied to what are usually termed inside hung brake beams, although it will be obvious herefrom that certain features of the invention may be applied to outside hung brake beams.

Of course there should preferably be a pair of brake beams 33, 34 as shown in Fig. 8 for instituting braking pressure upon each pair of wheels at the opposite end of the truck. Under the present invention each brake beam is to be of the preferred construction shown and described herein and each is preferably guided in its movements upon the side frames themselves, rather than to be supported by the usual brake beam hangers which are attached to the brake heads. The construction of the illustrated brake beam will be clearly understood from Fig. 1 in which only little more than half of the length thereof is illustrated, the end not shown being of similar construction to that in Fig. 1. It will be seen that each brake beam is preferably of truss construction and comprises a compression member 35 having upper and lower strengthening flanges 36, a tension member 37 and a strut 38 transverse of the mid-length of the beam to maintain the tension of the tension member 37 and the camber of the compression member 35. It will be seen from Fig. 8 that the beams 33, 34 are preferably inclined to the horizontal, they being arranged to transversely extend along lines which tend to converge with each other, at a point half way between the lower end of the window opening 26 in the side frame. Each beam may be of suitably forged or cast steel in all its parts and be specially formed to provide for the functions to be hereinafter recited.

Strut 38 of beam 33 is hollow lengthwise, the same having opposite side walls 39 which define a slot 40 open longitudinally thereof along the top, or what might be termed the top, although the strut is inclined laterally to conform to the required inclination and position of the live lever 27 or dead lever, as the case may be. The slot or hollow interior of the strut is closed for a desirable distance lengthwise of the strut by a bottom closure element 41 which constitutes a trap as it were, integral with the strut. The bottom closure trap 41 is located beneath the pivot pin 42 of live lever 27 to catch and detain the lower end of the lever in case of failure of the pivotal connection.

It will be observed from Fig. 1 that the flanges 36 of the brake beam have terminals such as 43 which converge with the compression member at points preferably opposite the wheel flanges with a view to permitting the application and removal of a brake head, as will be hereinafter described more fully. As the opposite ends of the brake beam are similarly constructed, it will be seen from Figs. 1, 6 and 7 in particular that end portions 44 of the beam are provided which extend from points just beyond the terminals 43 of flanges 36. As the beam is preferably cast or forged, each end portion 44 is preferably flattened throughout its length to the end surface 45 of the beam in the shape of a geometrical oblong, in cross-section. The so shaped end surfaces 45 are also curved slightly outwardly in arcs of large radius as indicated by the broken line, Fig. 1, and shown by Fig. 12. The mass of metal in each end portion 44 is preferably substantial inasmuch as the same must absorb the great thrust imparted thereto in applying a brake shoe to the car wheel.

Each side frame 15 is preferably recessed to provide at the inner surface thereof a straight recess 46, as shown more fully in Figs. 9 and 10, this recess extending from a point just below the adjacent column 18 and along a portion of the tension member 17 of the side frame. Such recess 46 of each side frame is preferably inclined upwardly and outwardly from the lower portion of the window opening 26. To obtain the best results each recess 46 should be inclined radially from the wheel axis at the corresponding side of the truck, to extend at an angle of approximately 12 degrees to the horizontal. In Fig. 2 the dot and dash line H indicates the horizontal passing through the wheel axis, and the dot and dash line A the 12 degree inclination, both of said lines radiating from the wheel axis. The reason for this preferred angle of inclination will appear herein later.

Parallel with the line A upper and lower guide flanges 47, 48 are preferably cast or formed integrally with the side frame, these flanges defining the vertical height and the length of recess 46. Each flattened end portion 44 of the beam unit (see Fig. 6) extends for a measurable distance into the corresponding recess 46 so that the beam is supported from opposite ends by both side frames and is movable therein in the plane in which the truss construction of the beam is formed, so that the end portions of the beam will serve to maintain the beam in the desired position transversely of the truck. Inasmuch as the weight of the beam will be imposed upon the bottom flange 48 of each side frame, such flange is reinforced and strengthened by means of integral brackets 50 which extend downwardly from said flange to points where they merge with the side frame. As the beam is to be confined in its guided movements and as an upward thrust therefrom may be transmitted to the upper guide flange 47 which is shown as spaced somewhat above the end portion of the beam, such flange is similarly strengthened and reinforced by brackets 49 which are cast integrally with the flange and the side frame proper. The reinforcing brackets 49 and 50 are shown more fully in ful lines in Figs. 1, 5, 6 and 10. That end of each recess 46 which is nearest to the corresponding wheel 22 is closed by a transverse wall 51 for the purpose of preventing undue forward movement of the beam, the opposite end of each recess being left open to permit removal of the beam from the side frames when it is desired, as will be later explained in full. Each recess 46 is provided with a suitable hard metal lining 52, which may be provided by a sheet of spring steel bent into U-shape in cross-section and protecting the adjacent inner surfaces of the flanges 47, 48 and the outward surface between them against wear. Hard metal wear surfaces are also preferably applied to the inner edges of the said flanges, and these may be obtained by providing the U-shaped lining 52 with oppositely bent flanges 53. See Figs. 4, 5, 6 and 9 for a clear illustration of such sheet metal means for providing suitable wear surfaces. As each outer end of the brake beam is spaced suitable distances away from the vertical wall of each recess, the beam can move slightly in a longitudinal direction and as the brake heads are applied to the beam preferably at points close to the flanges 47, 48, it is desirable to provide the wear surfaces 53 to take any lateral thrust of a brake head thereagainst.

On referring to Fig. 1 it will be seen that at 51a the brake-beam guide is cut away or inwardly offset directly opposite the tread 22 of the adjacent car wheel and that the wear protecting flanges 53 stop short of said offset 51a. The purpose thereof is to allow for clearance of the car wheel when there is excessive lateral approach thereof to the guide. From Figs. 4 and 9 it will be seen how the guide and wear lining are constructed with that end in view. The guide flanges in Fig. 9 have the inward offsets 51a and the upper and lower walls of the lining 52, Fig. 4, have corresponding inward offsets 52a, so that the end wall 51 of the guide recess is located at some distance inwardly of the free, parallel, edges of the guide flanges.

Referring to Figs. 2, 6, 8 and 9, side frame 15 is shown as trussed along its upwardly inclined portions by means of narrow reinforcing bottom portions 54 which are cast or formed integrally with the side frame, and which reinforcing portions define corresponding surfaces at the interior of the hollow side frame. As these trussing or reinforcing portions 54 are in the immediate regions of the recesses 46 in the side frame, the walls of the recesses are considerably strengthened at points where the weight and any downward movement of the brake beam is imposed upon the side frame. To further strengthen or reinforce the side frame in the same regions, it is preferable to cast the same with a vertical reinforcing web 55 (Fig. 6) which extends for a suitable distance along the hollow interior of the frame, thereby fortifying the added strength given by the reinforcing bottom portions 54 of the tension member.

As shown more fully in Figs. 5, 6 and 9, the flattened portion 44 at each end of the beam is formed with reduced terminals 56, that is to say, these are not as thick as the material of the end portion 44 which is between a terminal 56 and the terminals 43 of flanges 36 of the brake beam. Each reduced terminal 56 is desirably covered at the upper and lower surfaces and the end surface of the terminal with suitable hard metal to protect the terminals against wear. These wear surfaces may be obtained by a sheet of spring steel bent in the form of a U-shaped wear plate 57, the opposite walls thereof making up for the thickness removed by reducing the terminal 56, so that their opposite outer surfaces will be flush with the corresponding surfaces of the thicker material of the end portion 44. If the wear surfaces for the recesses and the beam ends are provided by the use of spring metal wear plates, instead of depositing chromium or some other hard metal on corresponding surfaces to be protected, which may be done if desired, the bent up plate 52 which may be sprung into the recess 46 may be provided with slight humps 58 to take into corresponding slight depressions in the flanges 47, 48, and the bent up plate 57 may be provided with slight humps 59 to take into similar depressions in each terminal 56 when the same is sprung thereonto. Such humps 58 and 59 will serve to retain the spring metal wear receiving surfaces in proper position. Specially constructed brake shoe heads 60, 61 are preferably provided as shown in Figs. 1, 2, 6, 7 and 8. As shown, the brake head 60, to which brake head 61 is similar, is of symmetrical shape having corresponding halves above and below the brake beam to which it is applied. It is preferably provided with an inclined shoe receiving face 62 as indicated by broken line in Fig. 1, the inclination corresponding to the angle of the coning of the car wheel 21, that is, corresponding to the 1 in 20 or other angle of inclination of the bevel of the tread 22. Each symmetrically formed brake head is shown as provided with parallel supporting jaws 63 formed with the backs of the upper and lower halves of the head. The inner surfaces of these jaws 63 are spaced apart just enough to snugly fit upon the flat outer surfaces of the end portions 44 of the beam, so that when a brake head is applied in position, the upper and lower halves will correspond to either side of the central longitudinal plane of the end portion 44. The mounting jaws 63 of the brake head receive suitable fastenings for securing the same rigidly to the brake beam, and such fastening may take the form of rivets 64 which pass through the flattened end portion 44 and the jaws 63. Each head will therefore be located close to the side frame flanges 47, 48 which guide the beam and between such flanges and the terminals 43 of the compression member of the beam.

Each brake head, such as 60, with laterally inclined face 62, receives a brake shoe 65, which, when rigidly secured in the well known manner to the head by means of a key 66 (Fig. 7), will cant or incline the shoe laterally inwardly of the vertical central plane of the head because the shoe is fixed against the said inclined face. As the result of the inwardly canted and rigid position of brake shoe 65 its tread engaging surface will fit squarely against the beveled tread 22 of the truck wheel and even wear of the shoe will take place.

Figs. 1, 2 and 7 show that the ends of the tension member 37 of the beam are of the same thickness as the end portions 44 of the beam, so that when braking pressure is not applied either of the brake heads may be removed after first removing the fastenings 64 thereof. A shoe of the brake head to be removed is taken off if desired and the jaw of the head is slid for a short distance inwardly along the tension member until the head clears the flange of the adjacent car wheel, whereupon the head may be moved off from the tension member. The removal of a shoe or a brake head can be accomplished by reason of the fact that access thereto can be had through the inspection opening in the side frame, inwardly of which opening the shoe and head can be seen in Figs. 2 and 8.

The functions and advantages inherent in the construction of truck shown and described, while previously somewhat explained, will now be set forth more in particular. In order to provide a unitary truck including the improved side frames and brake beam, it will be seen that brake beam 33 can be first engaged in the recess or slot 46 of side frame 15 and then the opposite end of the beam can be engaged in the corresponding recess or slot of the second frame (not illustrated) when it is brought up into position, so that the beam does not move in an arc, with the strut remaining parallel to the rail. In the improved construction the beam 33 is tilted as a unit in a plane parallel with the guide recesses or slots and in its travel it moves on an angle preferably of 12 degrees with respect to the horizontal, the horizontal and the line of travel intersecting at the axis of the wheels. The flattened bearing portions 56 of the beam being preferably very large, the beam cannot tilt, but will remain and operate on the radial lines from the center of the axle, the brake levers 27, 28 having a floating movement and the beam controlling them instead of their controlling the beam, so that friction from the brake levers is eliminated.

As the beam moves as a unit on the approximate 12 degree incline, release thereof is greatly assisted by gravity, gravity also assisting in allowing dirt, cinders or the like to escape from the open inner lower ends of the recesses or slots. The open ends of the guiding recesses 46 also enable the accomplishment of the important function of removing the brake beam. This can be done by removing the spring plank 24 if there should be one and raising the bolster 19. The brake release position of the beam 33 is illustrated by dot and dash lines in Fig. 1, and as the line R indicates the position of the nearest approach of the beam to the spring plank or the bolster during release from the brakes, it is clear that the spring plank if it be present will constitute positive stopping means against the beam being moved accidentally out of its working position. If the spring plank be absent, the lower belly of the bolster 19 will also act as such a stop, as is made clear from Figs. 3 and 8. However, in case of some applications of the improvements, it may be decided to close the lower inner ends of the guiding recesses or slots 46.

Because of the slight allowance for clearance above and at the end of each terminal 56 of the beam and which is within the guide in the side frame, as shown in Fig. 6, the beam may be removed from a plank type of truck by first removing the plank and the springs and then jacking up the bolster. A brake head is then removed from the desired end of the beam and thereafter the pivot pin 42 is removed. Then the brake beam will slide or can be slid down into contact with the spring seats. Said end of the beam is now moved out of its guide so as to come opposite the window opening 26 in the side frame having the guide, and the beam is thus canted to a slight inclination lengthwise with respect to its previous position, and then that end of the beam is pulled into that window opening, this movement pulling the opposite end of the beam out of the guide in the other side frame and permitting the beam to fall to the track, whereupon it can be removed from under the axle. The presence of the adjacent spring seat does not interfere with such manipulation of the beam, because the clearances between the beam and the walls of the guide permit the same; and when the beam is rigged up for operation the spring seats constitute stops for the ends of the beam and prevent the same from coming out of the guides of both side frames. In the spring plankless type of truck, all that is necessary in order to thus manipulate the beam for its removal is to first remove a brake head from one end and the pivot pin, and take out the one coil spring which would obstruct such end.

From Figs. 1, 3 and 11 it will be observed that the flanges or heads 36 and the body 35 of the brake-beam provide a compression member 35, 36, which is substantially T-shaped in cross-section and that the flanges 36 lie at the back of the beam, thus imparting the greatest vertical strength to the beam at its back. Hence, the strut 38 may be longer than if it merely extended to the compression member, inasmuch as it not only extends across the body or flange 35 but up to the flanges or heads 36, so that the strut and the compression member mutually reinforce each other across the said member. This same function applies between the strut and the tension member, which is substantially T-shaped in cross-section.

An important advantage is thus obtained with respect to the strut and the compression member, in that by constructing the beam so as to have its greatest strength at its extreme back,—that is at the back or outer side of the compression member,—the neutral axis of the beam therefore is located in the region of added strength, through the spreading apart of the two members of the beam at their greatest distance apart, with the ultimate object of preventing the beam from buckling or twisting in service.

In actual service it is the exception to find the brake shoes of equal thickness and in fact one shoe may be almost worn out at one end of a beam, whereas the shoe at the other end may be a new one. In the conventional type of brake rigging this causes the beam to cant lengthwise of itself and to throw great strains upon the hangers and brake heads, thereby causing breakage. Under the present invention this condition cannot exist, as it is to be noticed that the transverse end surfaces of the beam are formed on arcs 45, or with slight outward curvature, so that the beam can readily adjust itself to a correct alignment regardless of wheel or shoe wear and the inequality of the latter. Also, because of the fact that the beam is held in perfect alignment with the plane of the 12 degree inclination and the fact that each head is formed concentrically with the wheel, even brake shoe wear is assured. This allows for the full use of the brake shoes, whereas at the present time approximately sixty per cent. of the shoes are removed on account of being broken or partly worn out by uneven wear.

Because the camber of the brake beam probably cannot be held to a predetermined fraction of that required, it is of value to form the face 62 of any brake shoe head 60 at the same angle as the wheel coning, so as to bring the brake shoe 65 squarely in full contact with the coned thread of the car wheel. The brake head 60 being divided at its middle transverse plane, although an integral casting, so as to form upper and lower identical halves, making the head symmetrical, it will be seen that the head can be used as either a right or left one, simply by inverting the head when applied to either end of the beam. The head being mounted rigidly on the beam and secured by rivets, bolts or other substantial means, may be readily removed for replacement without removing the beam from the truck.

To those skilled in the art it is apparent that by adopting the principles of construction shown and described, a safety truck unit is provided which does not require any additional supports, aligning means or the like and that the parts of the unit are interlocked. Also as compared with the beams now generally in use, the beam has a greater clearance and as wheel and shoe wear take place, the angle of applied braking pressure remains the same. By supporting the brake beam on the walls of guide recesses or slots in the side frame in close proximity to the brake heads, all torsional strains are removed from the brake beam and imposed on the side frames. Any lateral movement of the brake beam is absorbed by the side frames, thus preventing the lateral swinging movement obtained by the use of hangers and thus assuring brake shoe alignment to the car wheels.

In the modification of the brake shoe head shown in Figs. 13, 14 and 15, the brake head 67 has its back constructed similarly to the one previously described, but its front portions are different from that one. However, the head is formed in one casting and has symmetrical upper and lower halves of identical construction and has the inclined face for receiving the back of the brake shoe. In said figures the head lugs 68 are adapted to receive between them the lug which is at the back of a brake shoe. The key-way 69 in the face portion of the head passes through the lugs 68 as shown in broken lines. The head is preferably cast or formed with longitudinal bridges 70, 71 which flank the longitudinal key-way 69, and provide lateral openings 72 located between the bridges and the body or back of the head. The outward facing surfaces of these bridges are formed as continuations of the corresponding surfaces of the toes of the head and the lugs 68, so that a substantially U-shaped front surface is formed for each half of the brake head, such surfaces of course being curved longitudinally of the brake head to conform with that of the back of a shoe which is to be held thereagainst. Preferably the so formed face of the head is inclined inwardly from one side of the head to the opposite side, as shown in Fig. 15, such inclination serving for canting the brake shoe laterally for the purpose hereinbefore explained.

It will be obvious to those skilled in the art that the invention or inventions shown and described herein are susceptible to more or less modification without departing from the spirit of the same as defined in the appended claims.

What I claim as new is,—

1. A car truck, including side frames, each having bolster guiding columns, a brake-beam extending transversely of and between the frames and guided at its ends on the frames in a direction to and from the columns and to and from the wheels, brake mechanism operably connected with the beam, and stop means between the columns to limit the extent of movement of the beam on releasing the brake mechanism.

2. A car truck, including side frames, each having bolster guiding columns, a brake-beam guided on the frames in a direction to and from the columns and to and from the wheels, brake mechanism operably connected with the beam, and a bolster guided by the columns to limit the extent of movement of the beam on releasing the brake mechanism.

3. A car truck, including side frames, each having bolster guiding columns, a brake-beam extending transversely of and between the frames and guided at its ends on the frames in a direction to and from the columns and to and from the wheels, brake mechanism operably connected with the beam, and a spring plank secured between the columns and engaged by such beam to limit the extent of movement of the beam on releasing the brake mechanism.

4. A car truck, including side frames, each having bolster guiding columns, a brake-beam, beam guiding means on the frames extending upon the columns nearest to the beam and toward the wheels, brake mechanism operably connected with the beam, and stop means between the columns to limit the extent of movement of the beam on releasing the brake mechanism.

5. A car truck, including side frames, each having bolster guiding columns, a brake-beam beam guides on and projecting inwardly of the frames, and extending toward the wheels, brake mechanism operably connected with the beam, and stop means between the columns to limit the extent of movement of the beam on releasing the brake mechanism.

6. A car truck, including side frames, a brake-beam of trussed type having flat end portions in line with the compression member, means supported by the side frames and guiding each end of the beam on a line, in the plane of its truss-breadth, radially of the wheel axes at an angle of approximately 12 degrees to horizontal, and means for operating the beam to apply or remove the braking pressure of the shoes against the wheels.

7. A car truck, including side frames, a brake-beam of trussed type having flat end portions in line with the compression members, and the beam having a length approximating the distance between the frames, and means on the frames for guiding each end of the beam in its movements toward and from the wheels, such guiding means maintaining the beam at all times in their own plane and in the plane of its truss-breadth.

8. A car truck, including side frames, a bolster guided on the middle portions of the frames, a pair of brake-beams, located one at each side of the bolster and between the wheels, and guiding means on the side frames for separately guiding the beams in converging planes when operated and which planes are inclined downwardly with respect to the wheels and upwardly with respect to the bolster, the bolster normally serving as a stop to maintain the beams in the guides when the truck is spring-plankless and adapted when raised above the said planes of the beams to permit the inward withdrawal of the beams from the guiding means.

9. A car truck, including side frames of trussed type, each having a compression member and a tension member, a bolster guided on the middle portions of the frames, a pair of brake-beams, located one at each side of the bolster and between the wheels, and guiding means on the tension members of the side frames for separately guiding the beams in converging planes when operated and which planes are inclined downwardly with respect to the wheels and upwardly with respect to the bolster, the bolster normally serving as a stop to maintain the beams in the guides when the truck is spring-plankless and adapted when raised above the said planes of the beams to permit the inward withdrawal of the beams from the guiding means.

10. A car truck, including side frames, a bolster guided on the middle portions of the frames, a pair of brake-beams, located one at each side of the bolster and between the wheels, and guiding means on the side frames for separately guiding the beams in converging planes when operated and which planes are inclined downwardly with respect to the wheels and upwardly with respect to the bolster, the bolster normally serving as a stop to maintain the beams in the guides when the truck is spring-plankless and adapted when raised above the said planes of the beams to permit the inward withdrawal of the beams from the guiding means, and the beams being of truss-type arranged breadthwise in the said converging planes.

11. A car truck, including side frames, a bolster guided on the middle portions of the frames, a pair of brake-beams, located one at each side of the bolster and between the wheels, and guiding means on the side frames for separately guiding the beams in converging planes when operated and which planes are inclined downwardly with respect to the wheels and upwardly with respect to the bolster, the bolster normally serving as a stop to maintain the beams in the guides when the truck is spring-plankless and adapted when raised above the said planes of the beams to permit the inward withdrawal of the beams from the guiding means, and each of the converging planes extended radially of the axes of each adjacent pair of wheels at an angle of approximately 12 degrees to horizontal.

12. A car truck, including side frames, having inclined guide recesses, a brake-beam having flat terminals lying in the plane of the beam, and supported and guided in the recesses, said plane corresponding to the plane of inclination, brake-shoe heads secured to the flat terminals to lie at an inclination at points close to the recesses and having identical portions above and below the terminals, and the said planes corresponding to an angle of approximately 12 degrees to the horizontal and being extended radially of the wheel axes.

13. A car truck, including side frames having inclined guide recesses, a brake-beam having flat terminals lying in the plane of the beam, and supported and guided in the recesses, said plane corresponding to the plane of inclination, brake-shoe heads secured to the flat terminals to lie at an inclination at points close to the recesses and having identical portions above and below the terminals, and the said planes corresponding to an angle of approximately 12 degrees to the horizontal and being extended radially of the wheel axes, the inner lower ends of the recesses being open inwardly to permit the disengagement and removal of the beam and heads thereon from the frames when desired.

14. A car truck including side frames, a brake beam, means on the frames for guiding the beam in its movements toward and from the wheels, brake shoes mounted upon the ends of the beam at points adjacent the guiding means, and a brake lever operable on the beam from its central portion, the beam having flat end portions whose end surfaces are on arcs lengthwise of such surfaces, and the beam being of a floating type to permit universal floating adjustment of the beam automatically to conform the wear surfaces of the shoes to the treads of the wheels, when the lever acts to apply brake pressure, irrespective of difference of wear or otherwise of the shoes upon said treads.

15. A car truck, including side frames, each having bolster guiding columns, a brake beam guided on the frames in a direction to and from the columns and to and from the wheels, brake mechanism operably connected with the beam, and stop means comprising spring seats to limit the extent of movement of the beam on releasing the brake mechanism.

16. A car truck, including side frames, each having bolster guiding columns and spring seats, a brake-beam, guides on the side frames which extend to points contiguous to the spring seats and whereby the beam may be guided on the frames in a direction to and from the columns and to and from the wheels, brake mechanism operably connected with the beam, the spring seats providing stop means to limit the extent of movement of the beam toward the spring seats when a spring plank is absent.

17. A car truck side frame including a compression member and a tension member, and a brake beam guide on the inner side of the tension member and which is substantially a continuation of the spring seat on the tension member, the spring seat adapted to prevent the beam from falling to the track.

18. A car truck side frame having a compression member and a tension member providing an inspection opening between them, a brake beam guide along the tension member located below the opening between the two members, and providing for the inspection of and for the removal and replacement of brake shoes through said opening.

19. In a car truck, the combination of side frames, a brake beam, guides on the frames for supporting and guiding the beam, stop means for preventing the beam from moving backwardly from the guides, and a brake head supported on each end of the beam, the head supporting surfaces of the beam and the corresponding surfaces of the head being so spaced apart as to permit the head to be removed inwardly along the beam without removing the beam.

20. In a car truck, the combination of side frames comprising a compression member and a tension member, a brake beam having two members converging in a guiding end portion at each end of the beam, guides on the tension members for supporting and guiding the end portions of the beam, means for confining the beam to a movement along the guides, a brake head supported on each end of the beam, and means permitting a head to be removed inwardly along one of the converging members without removing the beam.

21. A car truck, including side frames, a brake beam, brake heads and shoes supported thereby, guiding means on the frames receiving the ends of the beam, and guiding the beam on a line radially of the wheel axes at an angle of approximately 12 degrees to horizontal, and means for operating the beam to apply or remove the braking pressure of the shoes against the wheels, such guiding means maintaining the beam at all times in their own plane and in the plane of the beam's breadth.

22. A car truck, including side frames having bolster window openings, a brake-beam, means for guiding the ends of the beam upon the side frames at an angle which is inclined upwardly with respect to the window openings, the lower ends of the guides terminating at the window openings, and the beam removable from the lower ends of the guiding means and from the side frames only when a spring plank and the bolster springs are absent from the truck and the bolster jacked up so that the beam may be moved to a point close to the window openings, the beam then being removable from the truck by passing one end into one of the openings.

23. A car truck, including in combination side frames, a brake beam having its beam ends engaged with the frames, guiding means at the side frames and said ends maintaining the beam, during brake operation, on the side frames in an inclined plane of movement along lines extending downwardly and radially of the axes of adjacent coned-tread car wheels, such ends lying in said plane, and brake heads rigidly supported upon the said ends of such beam and extending substantially equidistantly above and below the ends and said plane, the heads having their shoe receiving faces constantly inclined to correspond substantially with the inclination of the coning and such inclined faces lying concentric with the treads of the wheels, the beam being of a floating type to permit universal floating adjustment of the beam automatically to conform the wear surfaces of the shoes to the treads of the wheels, irrespective of difference of wear of the shoes upon said treads.

CHARLES R. BUSCH.